(12) United States Patent
Johns

(10) Patent No.: US 9,215,902 B2
(45) Date of Patent: *Dec. 22, 2015

(54) VISOR WITH PLUG IN ACCESSORY SOCKETS

(71) Applicant: Foamula Products, Inc., Wellington, FL (US)

(72) Inventor: Stephen Johns, Merritt Island, FL (US)

(73) Assignee: Foamula Products, Inc., Wellington, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/279,994

(22) Filed: May 16, 2014

(65) Prior Publication Data

US 2014/0245521 A1 Sep. 4, 2014

Related U.S. Application Data

(63) Continuation of application No. 13/690,881, filed on Nov. 30, 2012, now Pat. No. 8,763,163.

(60) Provisional application No. 61/565,627, filed on Dec. 1, 2011.

(51) Int. Cl.
*A42B 1/18* (2006.01)
*A41D 27/08* (2006.01)
(Continued)

(52) U.S. Cl.
CPC . *A42B 1/004* (2013.01); *A42B 1/18* (2013.01); *A42B 1/24* (2013.01)

(58) Field of Classification Search
CPC .......... A42B 1/248; A42B 1/24; A42B 1/004; A42B 1/064; A42B 1/062; A42B 1/02; A42B 1/061; A42B 1/18; A42B 1/247; A42B 3/0406; A42B 1/067; A42B 1/068; A42B 1/205; A42B 1/241; A42B 1/244; A42B 3/02; A41D 2400/70; Y10S 2/918; Y10S 2/11; Y10S 2/909; G09F 21/02; G09F 2021/023; G09F 3/16; G09F 7/00; A44B 1/04; A44B 1/14; A44B 17/0047; A44B 1/32; A44C 3/001; A44C 25/007; A42C 5/00

See application file for complete search history.

(56) References Cited

U.S. PATENT DOCUMENTS 729,500 A 5/1903 Mahony
757,854 A 4/1904 Wickersham
(Continued)

FOREIGN PATENT DOCUMENTS

JP 2010229609 10/2010

OTHER PUBLICATIONS

Vizers Group, LLC, International Search Report mailed Feb. 24, 2014 for serial No. PCT/US2013/069220 filed on Nov. 8, 2013, 13 pages.

(Continued)

*Primary Examiner* — Bobby Muromoto, Jr.
(74) *Attorney, Agent, or Firm* — Brian S. Steinberger; Law Offices of Brian S. Steinberger, P.A.

(57) ABSTRACT

Visors formed from a pliable and flexible material, such as but not limited to EVA (ethylene vinyl acetate) having patterns of through-holes and partial cutouts for allowing accessories such as labels, charms, badges, puncture tool and sunglass/eyeglass supports and the like, to be plugged into the holes and cut-outs and easily removable and interchangeable with other accessories. A removable rear head strap be attached to the visor, having a plurality of holes with fasteners to adjust the strap to different head sizes.

20 Claims, 16 Drawing Sheets

(51) Int. Cl.
    *A42B 1/00*      (2006.01)
    *A42B 1/24*      (2006.01)
    *A41D 27/00*    (2006.01)

(56)             References Cited

U.S. PATENT DOCUMENTS

| | | |
|---|---|---|
| 1,190,427 A | 7/1916 | Kromer |
| 1,435,533 A | 11/1922 | Knackstedt |
| 1,452,305 A | 4/1923 | Mahony |
| 1,506,815 A | 9/1924 | Cormay |
| 1,624,727 A | 1/1927 | Goldberg |
| 1,782,206 A | 11/1930 | Kornsweet |
| 2,160,513 A | 5/1939 | Pasternak |
| 2,406,598 A | 8/1946 | Flood |
| 2,748,517 A | 6/1956 | Berkis |
| 2,968,812 A | 1/1961 | Vivolo |
| 3,484,974 A | 12/1969 | Culmone |
| 3,491,374 A | 1/1970 | Frangos |
| 3,849,839 A | 11/1974 | Zimber |
| 4,168,542 A | 9/1979 | Small |
| 4,507,344 A | 3/1985 | Baughman |
| 4,551,860 A | 11/1985 | Smit |
| 4,611,355 A | 9/1986 | Galanto |
| 4,612,672 A | 9/1986 | Schrack |
| 4,736,469 A | 4/1988 | Boretti |
| 4,776,043 A | 10/1988 | Coleman |
| 4,837,960 A | 6/1989 | Skaja |
| 4,873,726 A | 10/1989 | Tapia |
| 4,918,758 A | 4/1990 | Redina |
| 5,003,640 A | 4/1991 | Pizzacar |
| 5,070,545 A | 12/1991 | Tapia |
| 5,117,506 A | 6/1992 | Byrnes |
| 5,136,726 A | 8/1992 | Kellin |
| 5,276,985 A | 1/1994 | Halloran |
| 5,282,278 A | 2/1994 | Miner |
| D345,447 S | 3/1994 | Lapsker |
| 5,328,399 A | 7/1994 | Reynolds |
| 5,359,734 A | 11/1994 | Rathburn |
| 5,410,761 A | 5/1995 | Connelly |
| 5,418,981 A | 5/1995 | Miner |
| 5,428,842 A | 7/1995 | Wise |
| 5,437,064 A | 8/1995 | Hamaguchi |
| 5,442,817 A | 8/1995 | Miner |
| 5,452,479 A | 9/1995 | Mostert |
| 5,477,629 A | 12/1995 | Gleason |
| 5,509,144 A | 4/1996 | Soergel |
| 5,510,961 A | 4/1996 | Peng |
| 5,647,060 A | 7/1997 | Lee |
| 5,673,501 A | 10/1997 | Mathews |
| 5,713,083 A | 2/1998 | King |
| 5,734,991 A | 4/1998 | Schmid |
| 5,742,944 A | 4/1998 | Pfefferman |
| 5,754,983 A | 5/1998 | Landers |
| 5,773,118 A | 6/1998 | Eisenpresser |
| 5,790,988 A | 8/1998 | Guadagnino |
| 5,794,267 A | 8/1998 | Wallace |
| 5,803,266 A | 9/1998 | Blackwelder |
| 5,826,278 A | 10/1998 | King |
| 5,839,211 A | 11/1998 | Pallera |
| 5,845,334 A | 12/1998 | Marcolini |
| 5,887,287 A | 3/1999 | Potochnik |
| D410,134 S | 5/1999 | Wolken |
| 5,901,370 A | 5/1999 | Linday |
| 5,901,381 A | 5/1999 | Nelson |
| 5,983,400 A | 11/1999 | Kronenberger |
| 6,012,203 A | 1/2000 | Baron |
| 6,038,702 A | 3/2000 | Knerr |
| 6,038,704 A | 3/2000 | Crescentini |
| 6,044,495 A | 4/2000 | Ellman |
| 6,158,054 A | 12/2000 | Perry |
| 6,161,224 A | 12/2000 | Tuetken |
| 6,175,963 B1 | 1/2001 | Loeffelholz |
| 6,237,159 B1 | 5/2001 | Martin |
| 6,256,794 B1 | 7/2001 | Erickson |
| 6,279,167 B1 | 8/2001 | Johnson |
| 6,305,028 B1 | 10/2001 | Lin |
| 6,317,896 B1 | 11/2001 | Timms |
| 6,341,380 B1 | 1/2002 | Coleman |
| 6,349,415 B1 | 2/2002 | Gong |
| D457,298 S | 5/2002 | Rowland |
| 6,381,754 B1 | 5/2002 | Ezenekwe |
| 6,389,608 B1 | 5/2002 | Williams |
| D460,604 S | 7/2002 | Sullivan |
| 6,412,151 B1 | 7/2002 | Rowland |
| 6,460,193 B1 | 10/2002 | Di Palma |
| 6,513,167 B1 | 2/2003 | Cheng |
| 6,519,779 B1 | 2/2003 | Taguchi |
| 6,675,512 B1 | 1/2004 | Shwartz |
| 6,718,559 B1 | 4/2004 | Davidson |
| 6,769,139 B1 | 8/2004 | Goldkind |
| 6,802,140 B2 | 10/2004 | Aslanides |
| D501,705 S | 2/2005 | Hathaway |
| 6,993,858 B2 | 2/2006 | Seamans |
| D517,789 S | 3/2006 | Seamans |
| 7,089,691 B1 | 8/2006 | Silvera |
| D530,486 S | 10/2006 | Ruttan |
| 7,178,364 B2 | 2/2007 | Shapiro |
| 7,182,478 B2 | 2/2007 | Marston |
| 7,200,959 B2 | 4/2007 | Spann |
| D543,014 S | 5/2007 | Sharpe |
| D545,032 S | 6/2007 | Wolf |
| D545,033 S | 6/2007 | Wolf |
| 7,243,377 B2 | 7/2007 | Ashy |
| D558,955 S | 1/2008 | Taylor |
| D566,904 S | 4/2008 | Verhaeghe |
| D567,483 S | 4/2008 | Liow |
| 7,350,274 B2 | 4/2008 | Rogers |
| D571,082 S | 6/2008 | Kelleghan |
| 7,389,567 B2 | 6/2008 | Rogers |
| D579,606 S | 10/2008 | Scholl |
| D592,835 S | 5/2009 | Wilson |
| D593,285 S | 6/2009 | Olivo |
| D601,329 S | 10/2009 | Johns |
| D603,584 S | 11/2009 | Porter |
| D604,484 S | 11/2009 | Lauro |
| D606,288 S | 12/2009 | Thorne |
| 7,640,636 B2 | 1/2010 | Clark |
| 7,698,836 B2 | 4/2010 | Schmelzer |
| D618,128 S | 6/2010 | Clark |
| D619,336 S | 7/2010 | Eyl |
| D620,235 S | 7/2010 | Kronenberger |
| 7,765,618 B2 | 8/2010 | Egglesfield |
| D625,052 S | 10/2010 | Mastoras |
| 7,891,117 B2 | 2/2011 | Sack |
| 8,001,661 B2 | 8/2011 | Clark |
| 8,011,206 B2 | 9/2011 | Imai |
| 8,069,538 B2 | 12/2011 | Wilcox |
| D654,052 S | 2/2012 | Lee |
| 8,112,963 B2 | 2/2012 | Johnson |
| 8,122,519 B2 | 2/2012 | Schmelzer |
| D672,535 S | 12/2012 | Phan |
| 8,443,971 B1 | 5/2013 | Green |
| 8,453,267 B1 | 6/2013 | Stanley |
| 8,617,683 B2 | 12/2013 | Johnson |
| 8,627,516 B2 | 1/2014 | Evans |
| 8,763,163 B1 * | 7/2014 | Johns .......................... 2/200.1 |
| 2002/0118533 A1 | 8/2002 | Marston |
| 2004/0034903 A1 | 2/2004 | Blair |
| 2004/0093658 A1 | 5/2004 | Jackson |
| 2004/0117894 A1 | 6/2004 | Kuo |
| 2005/0198725 A1 | 9/2005 | Mollo |
| 2005/0273906 A1 | 12/2005 | Kim |
| 2006/0007668 A1 | 1/2006 | Chien |
| 2006/0152671 A1 | 7/2006 | Risso |
| 2007/0006502 A1 | 1/2007 | Schmelzer |
| 2007/0084019 A1 | 4/2007 | Wilcox |
| 2008/0060110 A1 | 3/2008 | Schmelzer |
| 2008/0141440 A1 | 6/2008 | Taylor |
| 2008/0263839 A1 | 10/2008 | Stillwell |
| 2009/0025113 A1 | 1/2009 | Kelleghan |
| 2009/0101162 A1 | 4/2009 | Hsu |
| 2010/0064419 A1 | 3/2010 | Lee |
| 2011/0078843 A1 | 4/2011 | Kennedy |
| 2011/0094015 A1 | 4/2011 | Braun |

(56) References Cited

U.S. PATENT DOCUMENTS

2012/0304691 A1 12/2012 Braun
2013/0318688 A1 12/2013 Cherin
2014/0137311 A1 5/2014 Sandoval

OTHER PUBLICATIONS

Jibbitz, Create Your Story, Jibbitz Shoe Charms, Crocs., Inc., online, 2012, http://www.crocs.comcrocs-jibbitz-compatible-crocs/jibbitz-compatible-crocs,defaults,sc . . . , 1 page.

Vizers Group, LLC, PCT Application No. PCT/US2013/069220 filed Nov. 8, 2013, Notification Concerning Transmittal of International Preliminary Report on Patentability mailed Jun. 11, 2015, 10 pages.

Logo Mark, Headwear, Vizers Group, LLC, Trademark Registration filed Jan. 22, 2014, http://www.trademarkia.com/logo-86171739.html, 3 pages.

Vizers at Surf Expo, posted on Facebook Sep. 13, 2013, https://www.facebook.com/myvizer/photos/pb.608478422509824.-2207520000.1439302702./647962368561429/?type=3&theatre, 1 page.

Vizers Hats Designed Specially for Attractions, Sea Thoughts, LLC, Feb. 15, 2013, http://www.attractionsmanagement.com/detail.cfm?Pagetype=detail&subject=product&codeID=304930, 1 page.

Vizers, Soft—Coloful—Comfortable. . . and they Float!, Mar. 15, 2012, https://web.archive.org/web/20120315105657//http://www.vizers.com/, 1 page.

\* cited by examiner

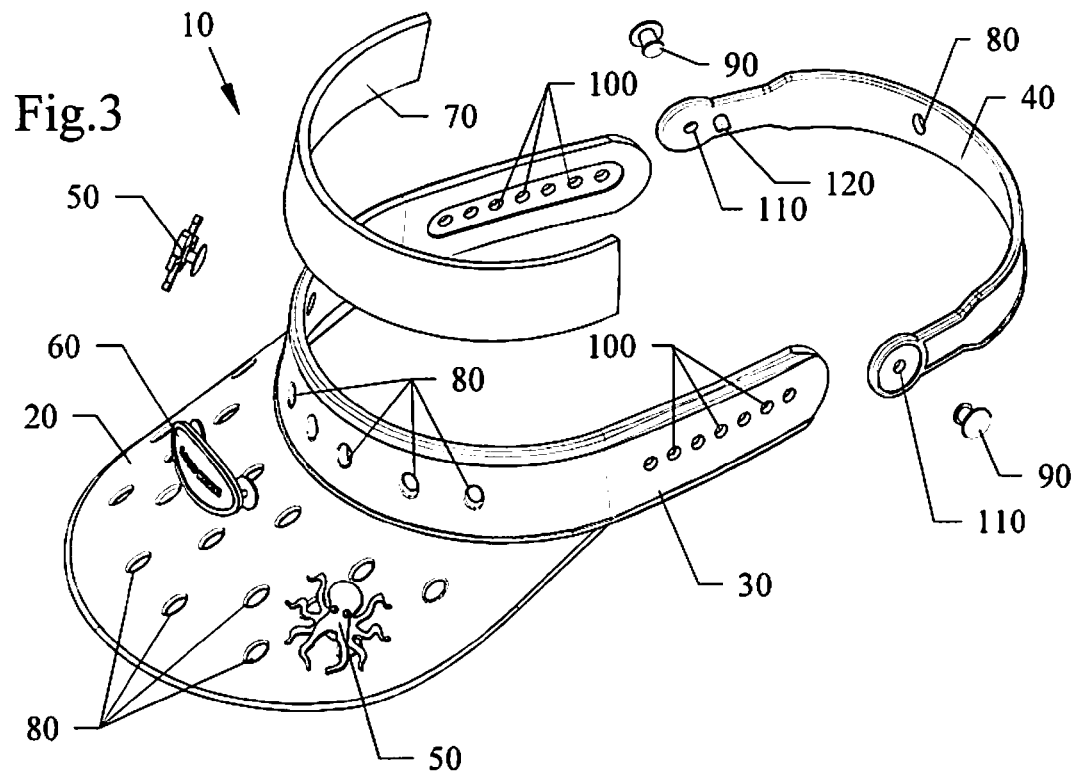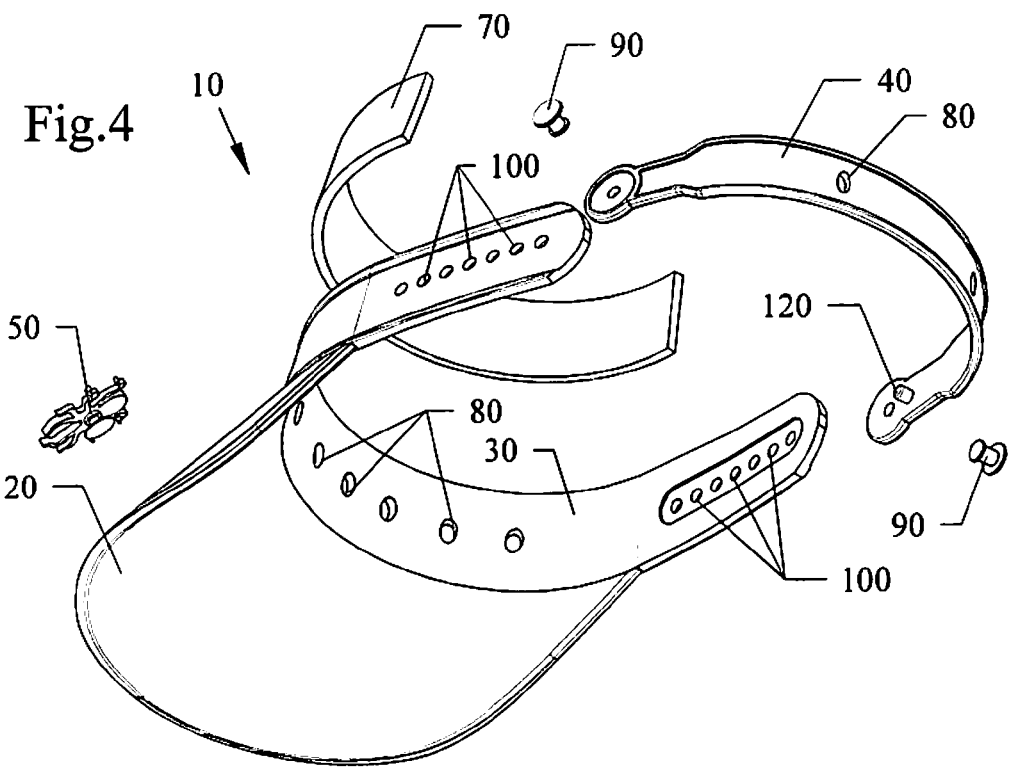

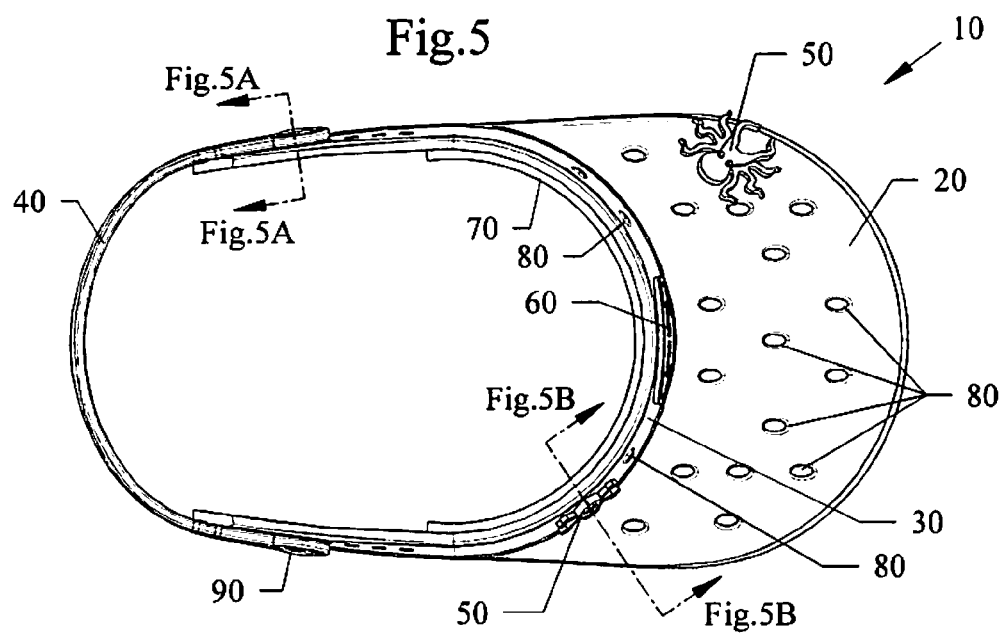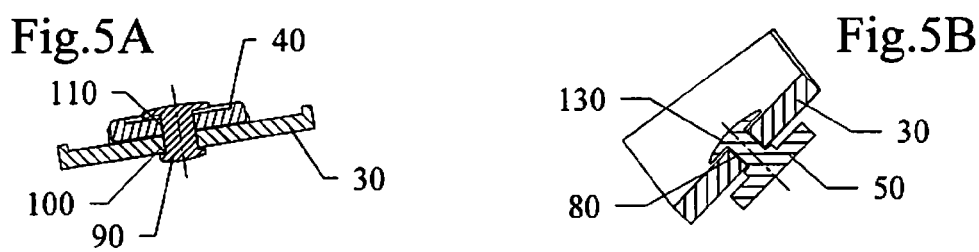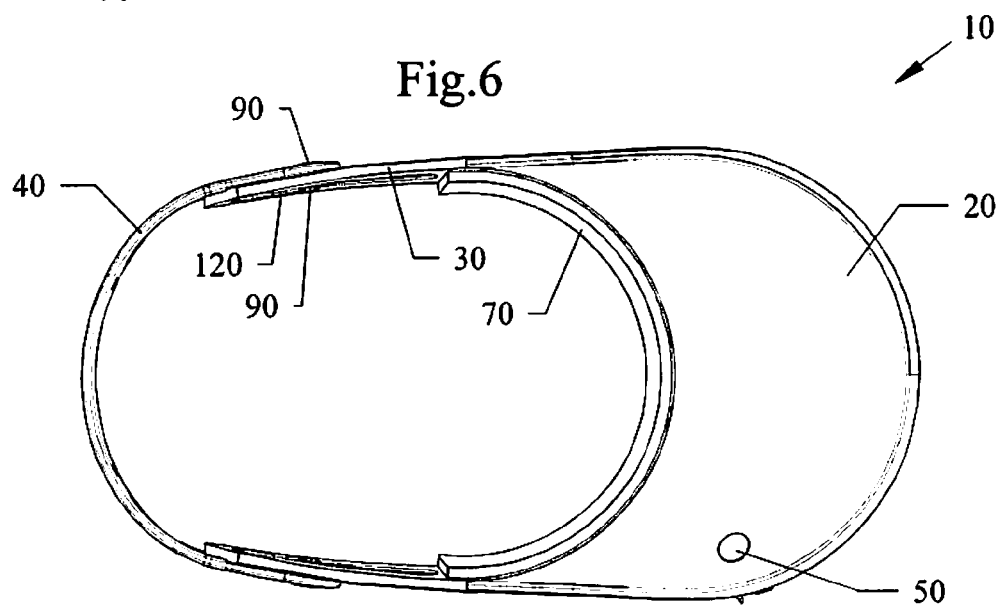

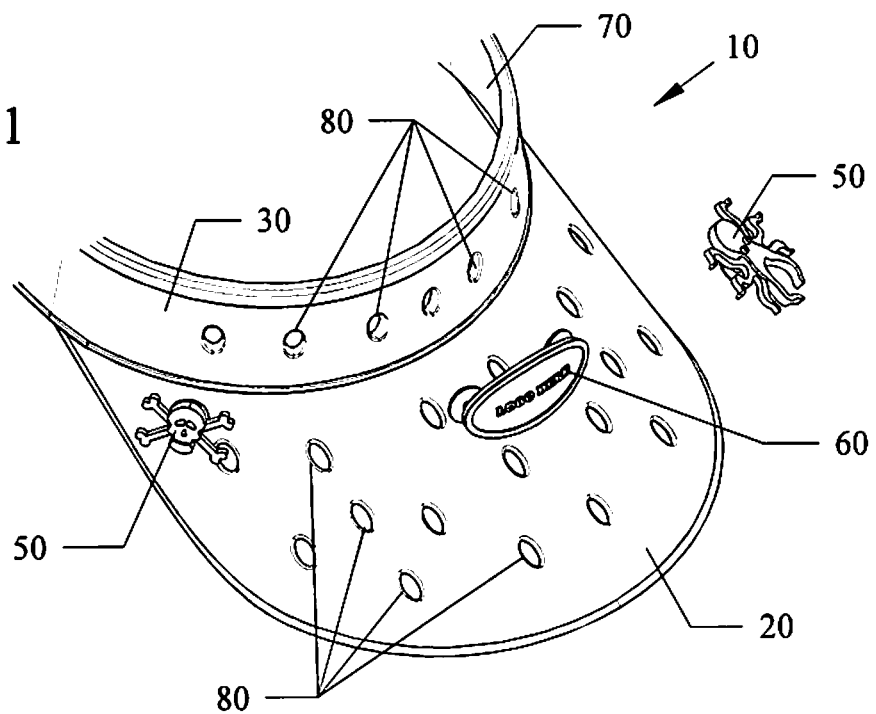
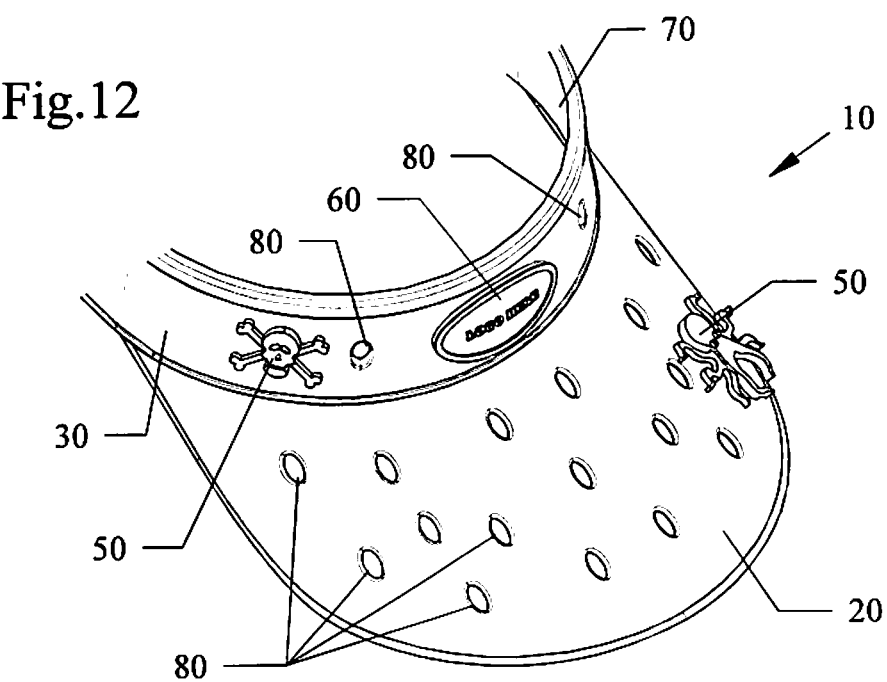

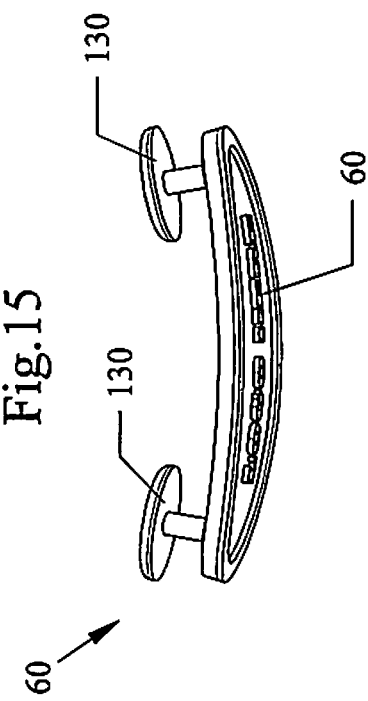
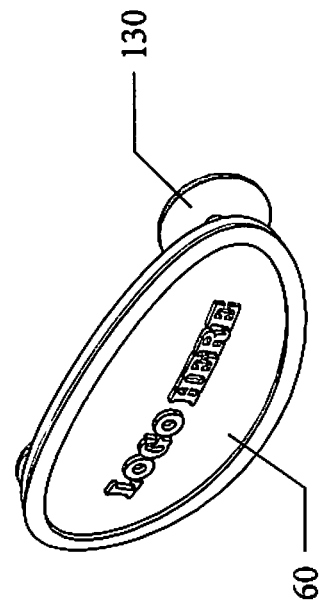
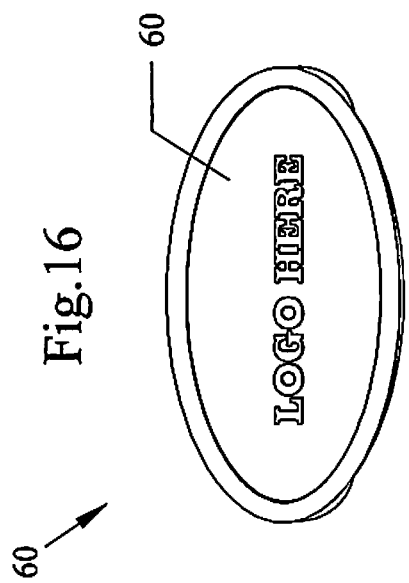
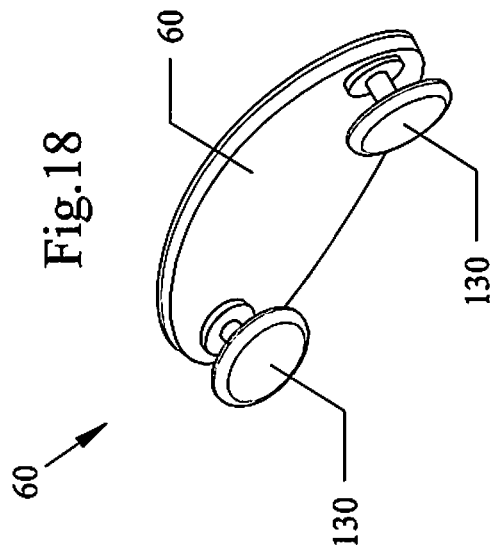

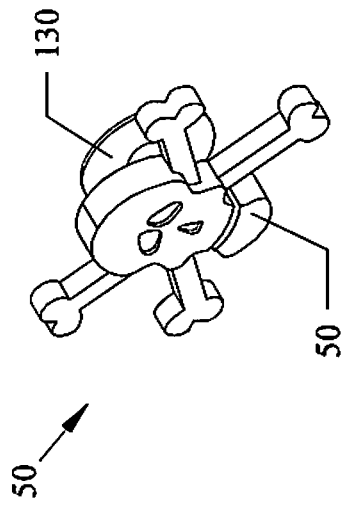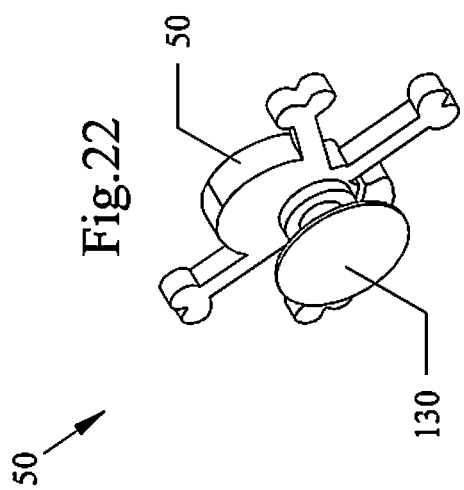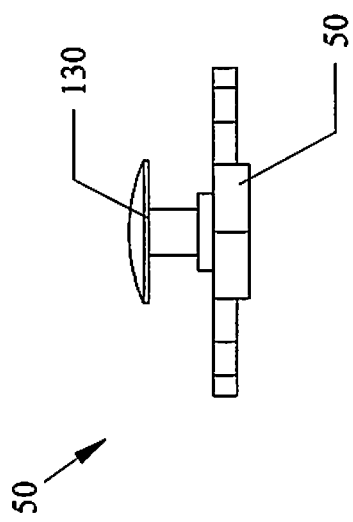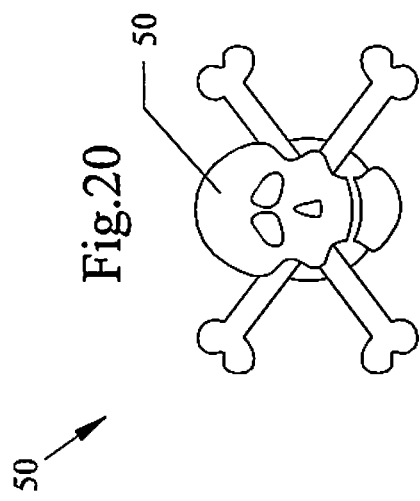

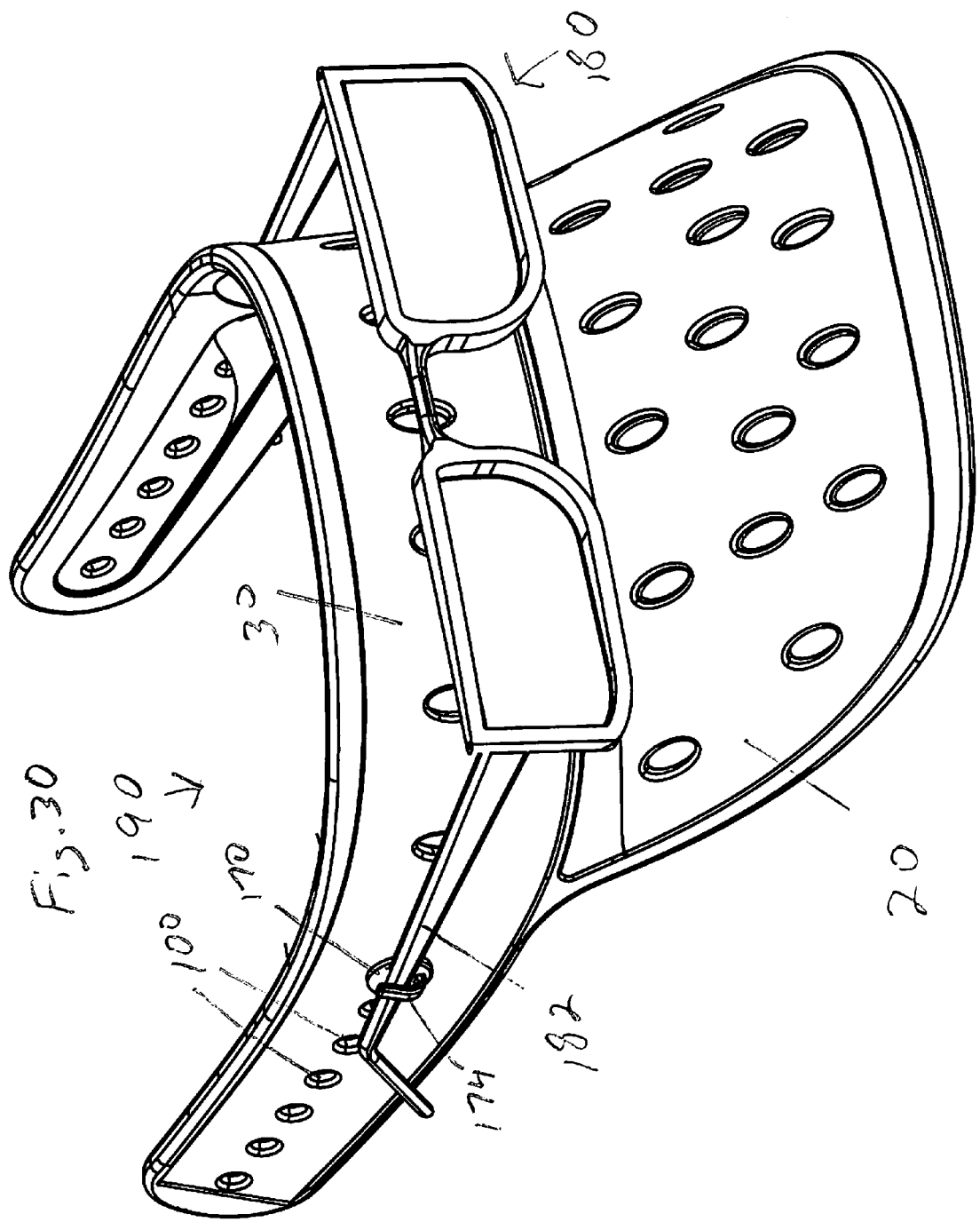

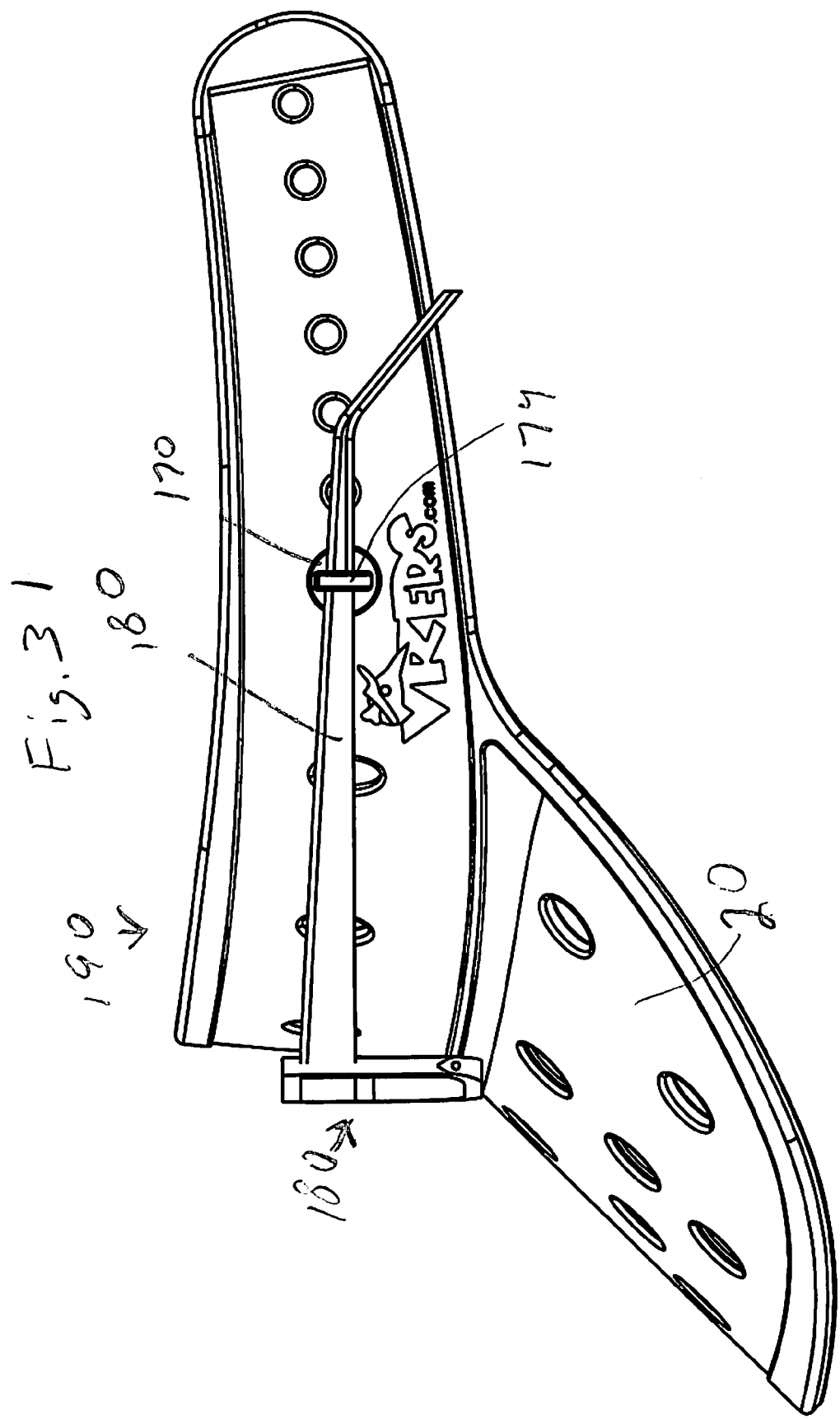

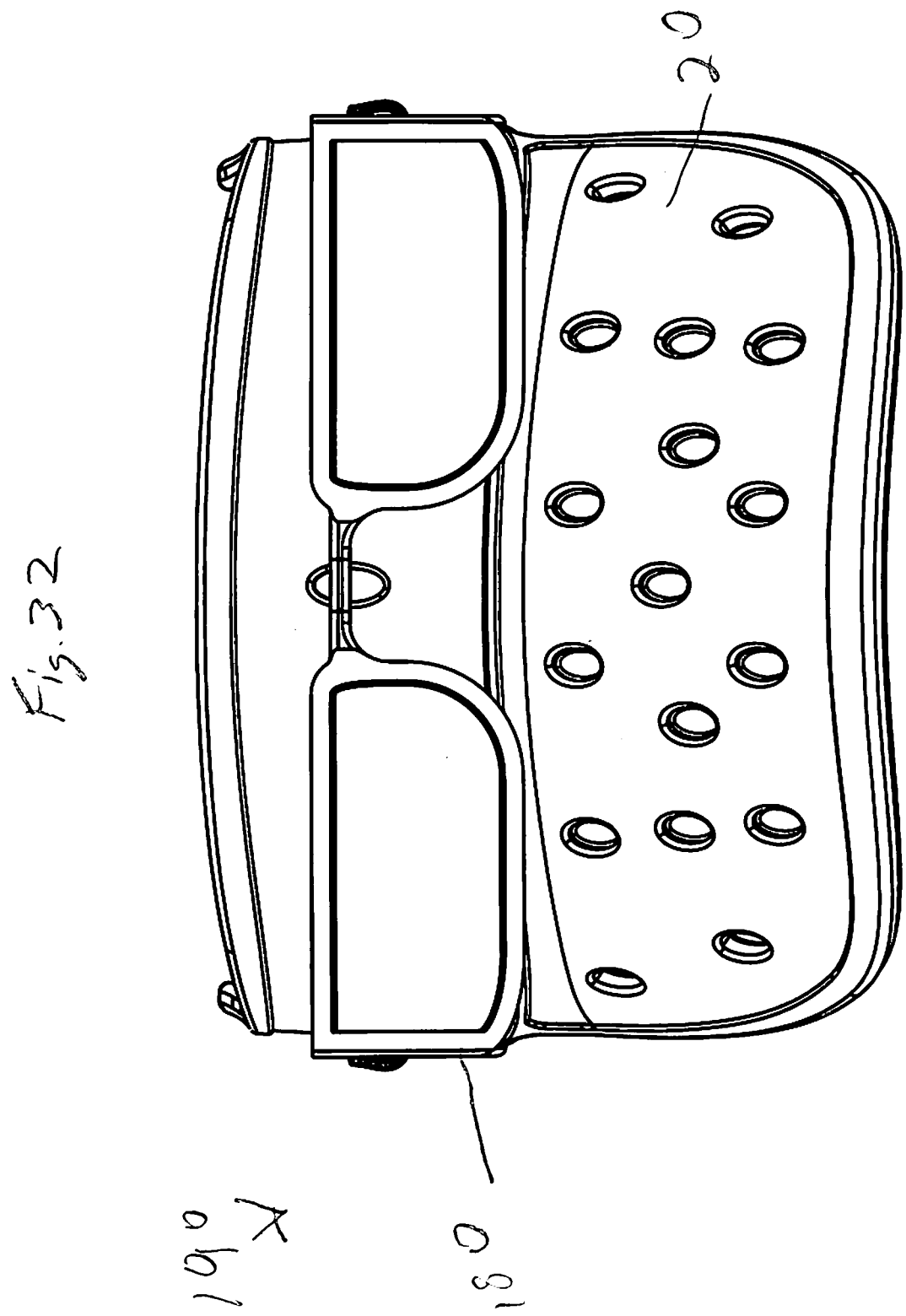

VISOR WITH PLUG IN ACCESSORY SOCKETS

This application is a Continuation of U.S. patent application Ser. No. 13/690,881 filed Nov. 30, 2012, now U.S. Pat. No. 8,763,136, which claims the benefit of priority to U.S. Provisional Patent Application Ser. No. 61/565,627 filed Dec. 1, 2011. The entire disclosure of each of the applications listed in this paragraph are incorporated herein by specific reference thereto.

FIELD OF INVENTION

This invention relates to hats and caps, in particular to head visor assemblies, apparatus, and methods of using a soft type foam visor having patterns of different shaped hole openings, such as but not limited to geometrical shapes, letters, characters, and the like, that allow for accessories such as labels, charms, badges, sunglasses, and the like, to be plugged into the openings and easily removable and interchangeable with other accessories.

BACKGROUND AND PRIOR ART

Sun visors have become a popular type of headgear for keeping the sun off the face of the wearer. Often the visors are formed from a cloth or fabric type material with a fixed band. Other types of well known visors are formed from a hard plastic with rearwardly extending curved bands which wrap about part of the head of the wearer.

A problem with these prior art visors is that indicia (such as but not limited to advertisements, etc.) must be permanently fixed thereon. For example, sewing a label on a cloth or fabric visor is well known, but the label is not easily removable.

Painting indicia with markers and the like, can also be done on prior art visors, but the paint is also generally permanent. Peel and stick decals can also be used, but they are also intended to be permanent and are not intended to be easily removed or changed.

Using a hook and loop fastener, such as Velcro®, can also be used, but at least one side of the hook and loop fastener, must also be permanently attached to a surface of the visor.

Caps and visors have been made over the years with holes. See for example, U.S. Pat. No. 1,782,206 to Kornsweet; D460,604 to Sullivan; D601,329 to Johns, the latter being the inventor of the subject invention. However, the holes were used for ventilation and/or decoration, and were not useful for mounting and supporting indicia thereon.

Thus, the need exists for solutions to the above problems with the prior art.

SUMMARY OF THE INVENTION

A primary objective of the present invention is to provide head visor devices, apparatus, and methods of using a soft type foam visor having patterns of partial and/or full cutout hole openings that allow for accessories such as labels, charms, badges, and the like, to be plugged into the openings and easily removable and interchangeable with other accessories.

A secondary objective of the present invention is to provide head visor devices, apparatus, and methods of using a soft type foam visor having patterns of partial and/or full cutout hole openings that allow for accessories such as labels, charms, badges, and the like, to be easily removable and interchangeable with other accessories.

A third objective of the present invention is to provide head visor devices, apparatus, and methods of using a soft type foam visor having patterns of partial and/or complete throughhole openings that allow for accessories, having an adjustable head strap that is also removable.

A fourth objective of the present invention is to provide head visor devices, apparatus, and methods of using a soft type foam visor having patterns of partial and/or complete throughhole openings with a puncture tool that can turn partial cutouts into throughhole cutouts to mount accessories thereon.

A fifth objective of the present invention is to provide head visor devices, apparatus, and methods of using a soft type foam visor having patterns of partial and/or complete throughhole openings having different shapes, such as but not limited to different geometrical shapes, letter shapes, character shapes, and the like, in order to mount accessories thereon.

A sixth objective of the present invention is to provide head visor devices, apparatus, and methods of using a soft type foam visor having patterns of partial and/or complete throughhole openings that allow for accessories such as adapters to be able to mount sunglasses/eyeglasses to the visor.

A visor assembly, can include a visor with headband formed from a flexible and pliable material, a plurality of slot shapes on a front surface portion of the visor with headband, at least one accessory having a male member that mateably attaches into at least one of the slots, wherein the accessory is both attachable and detachable from the visor with headband.

The visor assembly of claim 1, can include a removable strap having ends that are attachable to left and right portions of the headband, the removable strap being formed from the flexible and pliable material. The removable strap can include rivet members having inwardly protruding portions for being insertable into a plurality of adjustment holes in the removable strap. The visor material can be EVA (ethylene vinyl acetate).

The accessory can include a logo plate, having indicia across a front surface of the logo plate, and/or a decorative charm.

The slot shapes can include circular shapes, noncircular geometrical shapes, outline shapes of different characters and objects.

The slot shapes can include through-hole cutouts through the visor, and/or partial cutouts through only a surface portion of the visor.

A puncture tool can be included for puncturing a partial-cutout into a through-hole cutout. An adapter can be used for attaching sunglasses/eyeglasses to the visor assembly.

A visor assembly kit, can include the combination of a visor with headband formed from a flexible and pliable material, a plurality of both through-hole slots and partial cut-out slots along a front surface portion of the visor with headband, a removable strap having ends that are attachable to left and right portions of the headband, the removable strap being formed from the flexible and pliable material, and a plurality of accessories, each accessory having a male member that mateably attaches into at least one of the through-hole slots and partial cut-out slots, wherein the accessories are both attachable and detachable from the visor with headband, and wherein the accessories are selected from the group consisting of logo plates and decorative charms and a puncture tool to punch out a partial cutout, and an adapter for mounting sunglasses/eyeglasses to the visor assembly. The plurality of both through-hole slots and partial cut-out slots, can include different shapes, such as different geometrical shapes, letters, character outlines.

Further objects and advantages of this invention will be apparent from the following detailed description of the presently preferred embodiments which are illustrated schematically in the accompanying drawings.

BRIEF DESCRIPTION OF THE FIGURES

FIG. 3 is a top exploded perspective view of the visor assembly of FIG. 1.

FIG. 4 is a bottom exploded perspective view of the visor assembly of FIG. 3

FIG. 5 is a top view of the visor assembly of FIG. 1.

FIG. 5A is a cross-sectional view of the band rivet connection of FIG. 5 along arrow 5A.

FIG. 5B is a cross-sectional view of the charm connection of FIG. 5 along arrow 5B.

FIG. 6 is a bottom view of visor assembly of FIG. 5.

FIG. 11 is a top front perspective view of the visor assembly of the preceding figures showing logo plate and charm ready to be installed.

FIG. 12 is another top front perspective view of the visor assembly of FIG. 11 showing logo plate and charms installed.

FIG. 15 is a top view of a logo plate for the visor assembly of the preceding figures.

FIG. 16 is a front view of the logo plate of FIG. 15.

FIG. 17 is a front right perspective view of the logo plate of FIG. 15.

FIG. 18 is a rear right perspective view of the logo plate of FIG. 15.

FIG. 19 is top view of a charm accessory for the visor assembly of the preceding figures.

FIG. 20 is a front view of the charm of FIG. 19.

FIG. 21 is a front right perspective view of the charm of FIG. 19.

FIG. 22 is a rear right perspective view of the charm of FIG. 19.

FIG. 30 is a front perspective view of a visor assembly with adapter of FIG. 27 and mounted sunglasses/eyeglasses.

FIG. 31 is a side view of the visor assembly, adapter and mounted sunglasses of FIG. 30.

FIG. 32 is a front view of the visor assembly, adapter and mounted sunglasses of FIG. 30.

DESCRIPTION OF THE PREFERRED EMBODIMENTS

Figure 1:
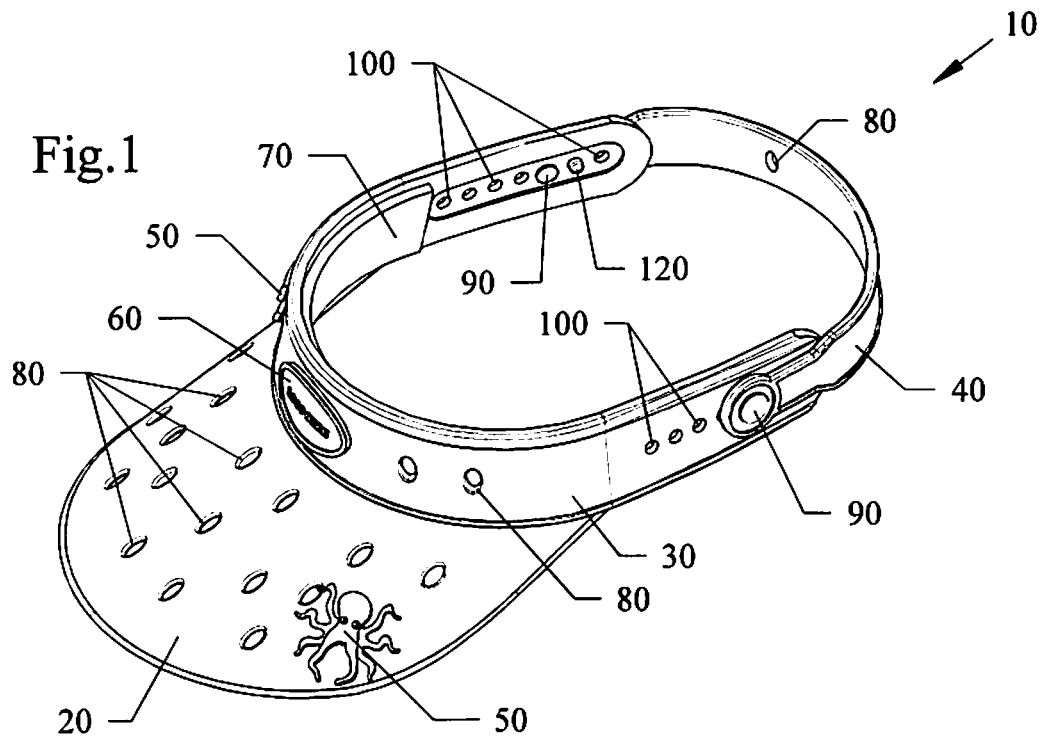
FIG. 1 is a top perspective view of the novel visor assembly.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

A listing of components will now be described.

10 visor assembly.
20 Visor/brim.
30 Headband.
40 Back band.
50 Snap-in charm.
60 Snap-in logo plate.
70 Sweat band.
80 Through-hole cutouts and/or partial cut-outs for charms and logo plate.
90 Back band rivet.
100 Back band adjustment holes in headband.
110 Rivet hole in back band.
120 Back band alignment stud.
130 Studs to secure logo plate and charms into cutouts.
140. Puncture tool
142. front of tool
144. raised gripping surface
145. puncture tip
147. stem
148. stud/rear wall
150. visor assembly with different shaped cutouts
152. letter shaped cutout
154. star shaped cutout
158. half moon shaped cutout
160. visor assembly with more different shaped cutouts
162. triangle shaped cutout
164. rectangular/square shaped cutout
166. cartoon character shaped cutout
170. adapter for eyeglasses/sunglasses
172. front wall of adapter
174. curved hook
175. stem
178. stud/rear wall
180. eyeglasses/sunglasses
182. arm(s)
190. visor assembly for eyeglasses/sunglasses The inventor of the subject invention is also the inventor on U.S. Design Pat. D601,329 to Johns, which is incorporated by reference.

Figure 2:
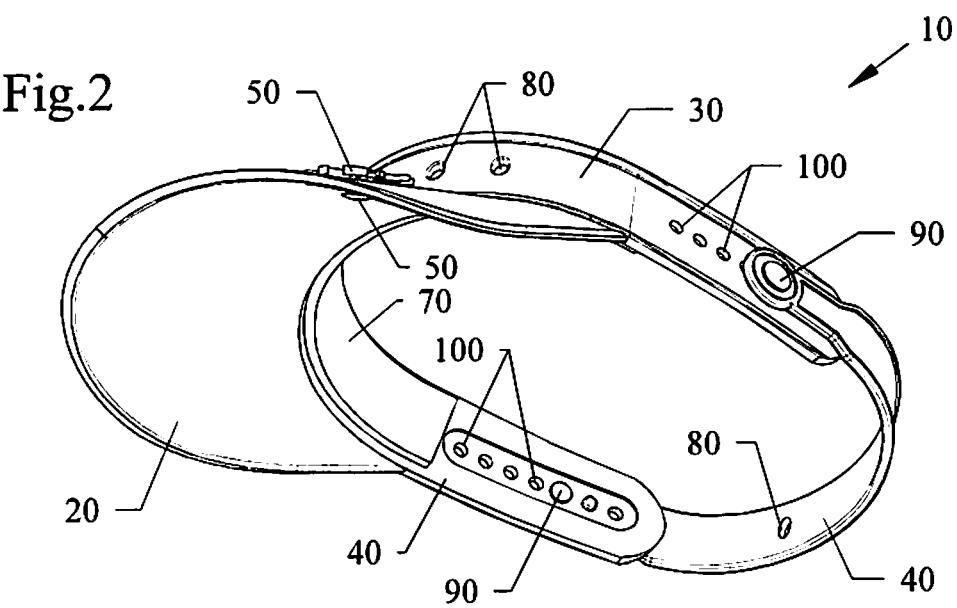
FIG. 2 is a bottom perspective of the visor assembly of FIG. 1.

FIG. 1 is a top perspective view of the novel visor assembly 10. FIG. 2 is a bottom perspective of the visor assembly 10 of FIG. 1. FIG. 3 is a top exploded perspective view of the visor assembly 10 of FIG. 1. FIG. 4 is a bottom exploded perspective view of the visor assembly 10 of FIG. 3 FIG. 5 is a top view of the visor assembly 10 of FIG. 1.

FIG. 5A is a cross-sectional view of the band rivet connection of FIG. 5 along arrow 5A.

FIG. 5B is a cross-sectional view of the charm connection of FIG. 5 along arrow 5B.

Figure 7:
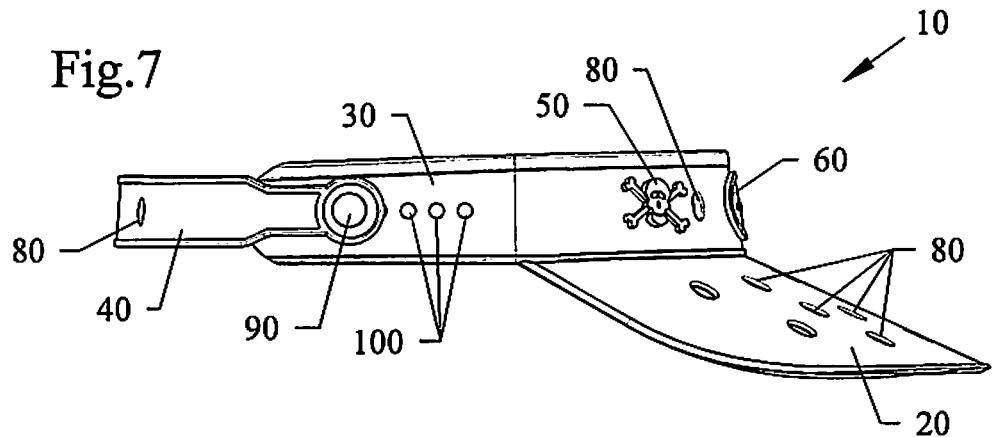
FIG. 7 is a right side view of the visor assembly of FIGS. 5-6.
Figure 8:
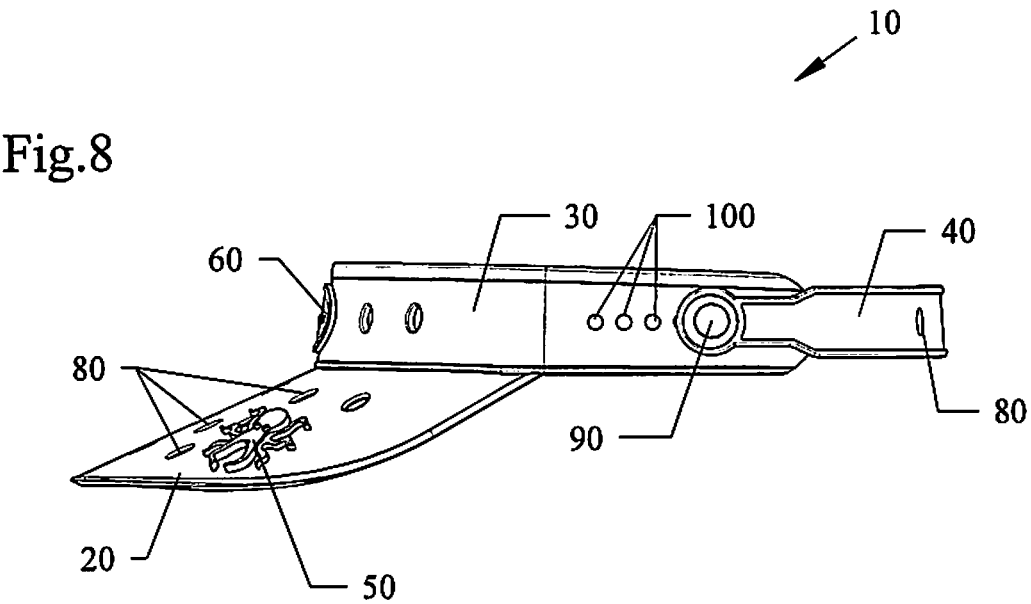
FIG. 8 is a left side view of the visor assembly of FIGS. 5-6.
Figure 9:
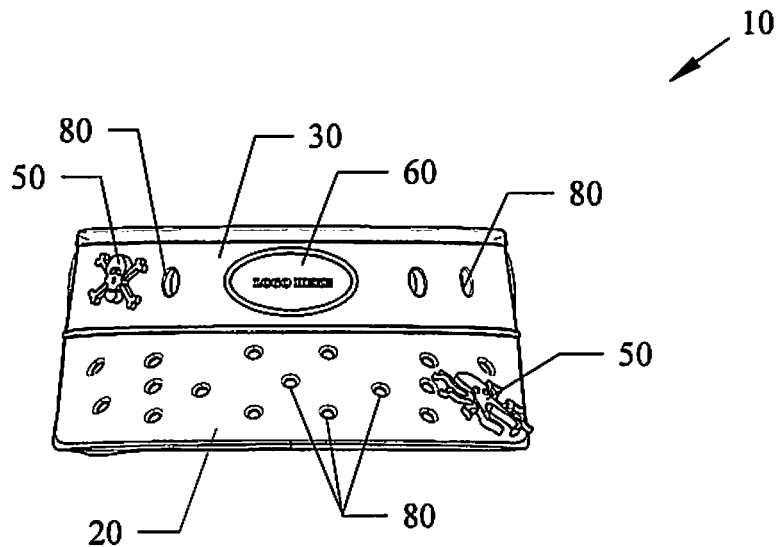
FIG. 9 is a front side view of the visor assembly of FIGS. 5-8.
Figure 10:
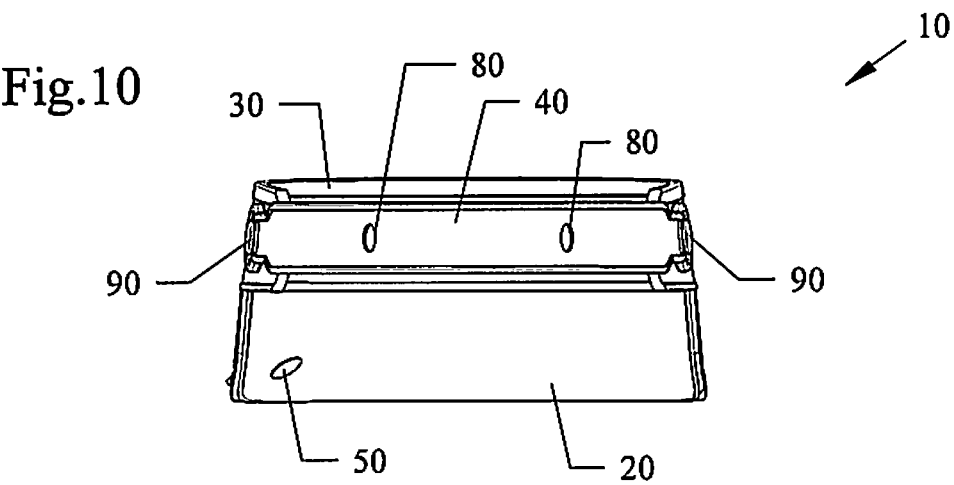
FIG. 10 is a rear side view of the visor assembly of FIGS. 5-8.

FIG. 6 is a bottom view of visor assembly 10 of FIG. 5. FIG. 7 is a right side view of the visor assembly 10 of FIGS. 5-6. FIG. 8 is a left side view of the visor assembly 10 of FIGS. 5-6. FIG. 9 is a front side view of the visor assembly 10 of FIGS. 5-8. FIG. 10 is a rear side view of the visor assembly 10 of FIGS. 5-8.

FIG. 11 is a top front perspective view of the visor assembly 10 of the preceding figures showing logo plate and charm ready to be installed.

FIG. 12 is another top front perspective view of the visor assembly 10 of FIG. 11 showing logo plate and charms installed.

Figure 13:
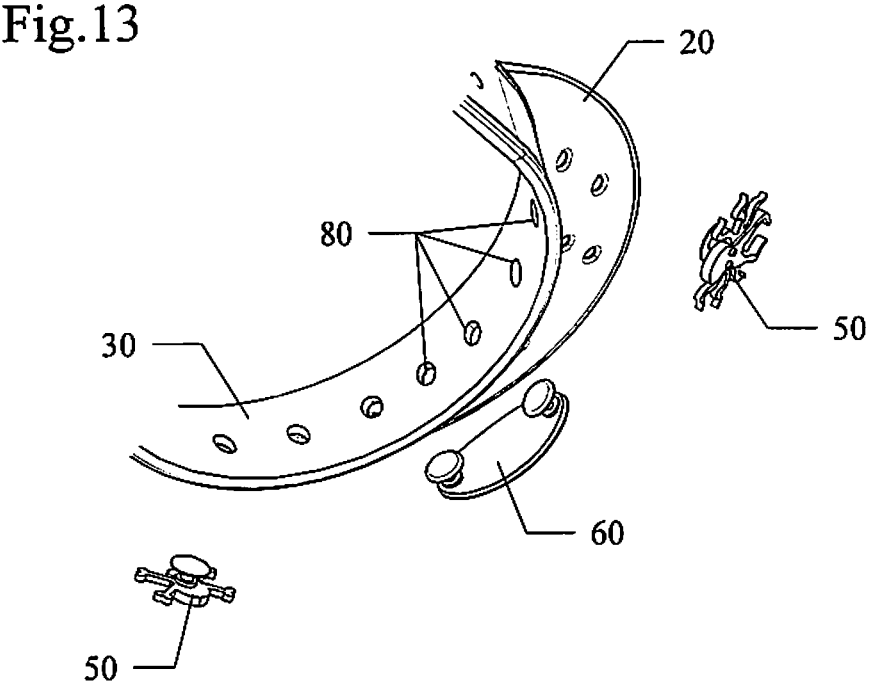
FIG. 13 is a bottom front inside perspective view of the visor assembly of FIG. 11 showing logo plate and charm ready to be installed.

FIG. 13 is a bottom front inside perspective view of the visor assembly 10 of FIG. 11 showing logo plate and charm ready to be installed.

Figure 14:
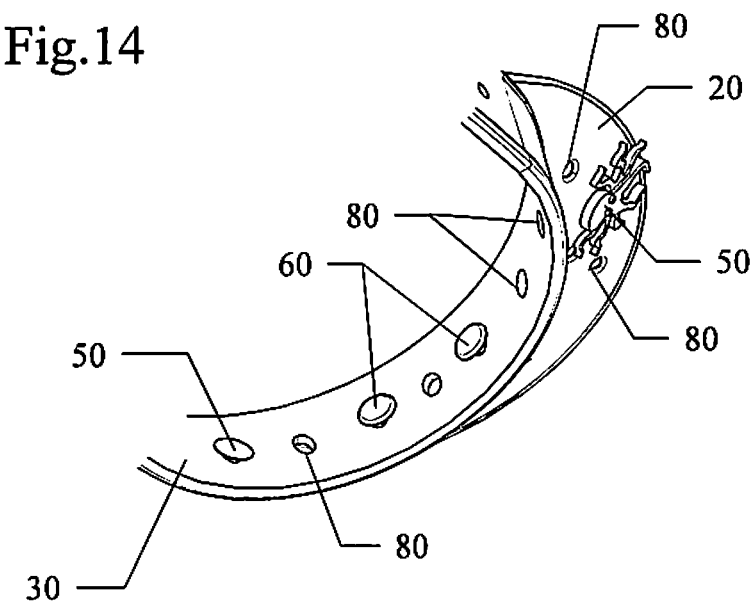
FIG. 14 is a bottom front inside perspective view of the visor assembly of FIG. 13 showing logo plate and charm installed.

FIG. 14 is a bottom front inside perspective view of the visor assembly 10 of FIG. 13 showing logo plate and charm installed.

FIG. 15 is a top view of a logo plate for the visor assembly 10 of the preceding figures. FIG. 16 is a front view of the logo plate of FIG. 15. FIG. 17 is a front right perspective view of the logo plate of FIG. 15. FIG. 18 is a rear right perspective view of the logo plate of FIG. 15. The logo plates can have indicia on a front surface portion, such as but not limited to advertisements, sports teams, names, pictures, and the like.

FIG. 19 is top view of a charm accessory for the visor assembly 10 of the preceding figures. FIG. 20 is a front view of the charm of FIG. 19. FIG. 21 is a front right perspective view of the charm of FIG. 19. FIG. 22 is a rear right perspective view of the charm of FIG. 19. The charm accessory can be a decorative part, such as but not limited to a Jibitz™. The decorative pieces, can include various types of shapes, such as but not limited to animals, fish, birds, cartoon characters, flowers, trees, and the like.

Referring to FIGS. 1-22, the visor assembly can be comprised of two or three components. The main two components are the front part of the visor assembly which includes a visor portion 20 with front head band portion 30, that is separated from and attachable to a back band 40 type strap. A third component can be a sweatband 70 that can be attached into the inside wall of the head band portion 30.

The visor portion 20 with front band portion 30, and the back band (strap) 40 can be formed from or molded from a soft plastic, such as but not limited to EVA (ethylene vinyl acetate). The novel visor 10 can also be water proof, float in water, be antibacterial, have good clarity and gloss, barrier properties, low-temperature toughness, stress-crack resistance, hot-melt adhesive, and resistance to UV (ultra violet) radiation. EVA has little or no odor and is competitive with rubber and vinyl products in cost. The invention can be formed from other materials, similar to EVA, that also have similar properties.

The visor assembly 10 of the previous figures can have partial cutouts instead of completely through-hole cutouts 80. The partial cut-outs can have indentations through the visor/brim 20 and/or through the headband 30 that are not complete through-holes. These partial cut-outs can be molded to have narrow thicknesses than the rest of the visor/brim 20 and headband 30 material. As such, the user can use a puncture tool 140 as described in FIGS. 23-24 to complete the cut-out through the visor/brim 20 and/or headband 30 as desired. For example, a visor assembly 10 can have a mix of through-hole cutouts and partial cut-outs. Alternatively, the visor assembly can have all through-hole cutouts or all partial cut-outs.

Figure 23:
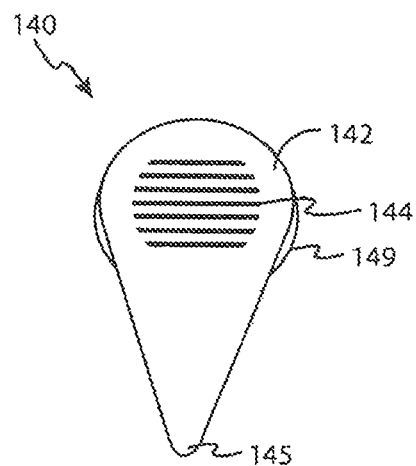
FIG. 23 is a front view of a puncture tool for use with visor assembly.
Figure 24:
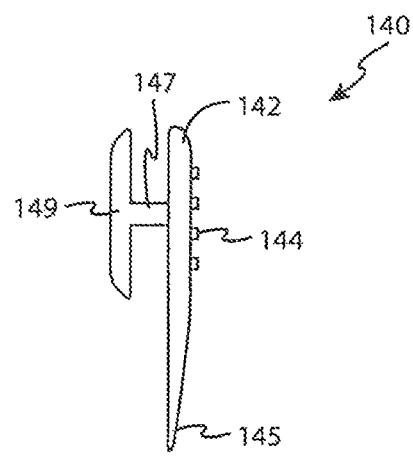
FIG. 24 is a side view of the puncture tool of FIG. 23.

FIG. 23 is a front view of a puncture tool 140 for use with visor assembly. FIG. 24 is a side view of the puncture tool 140 of FIG. 23. On the front 142 of the tool 140 can be a gripping surface that can have raised ribs or grooves thereon, and extending downward can be a narrow tip 145. The stud/rear wall 148 can be joined to the front wall by a stem portion 147.

In operation, the user can grip the tool 140 by pinching the front wall 142 and rear wall 148 between two fingers, and push the narrow tip 145 into a partial cut-out opening 80 as desired to mount charm(s) 50, logo plate(s) 60 thereon. The tool 140 can also be stored on the visor assembly 1 by pushing the stud/rear wall 148 into a throughhole cut-out 80 on the visor assembly.

The invention can be distributed and/or sold in a package or kit form, having visor assembly 1, along with a plurality of logo plates 60 and decorative (charm) parts 50 and puncture tool 140, and sunglass/eyeglass adapter 170.

Although, the cut-out slots (sockets) 80, 100 for the labels 60 and charms 50 are shown to be circular, the sockets can have other geometrical shapes, such as but not limited to triangular, rectangular, hexagon, and the like. Still furthermore, the sockets can be customized into other desirable shapes such as but not limited to character outline shapes, such as MICKEY MOUSE®, animals, mammals, birds, fish, and any other desirable outline shape, and the like.

Figure 25:
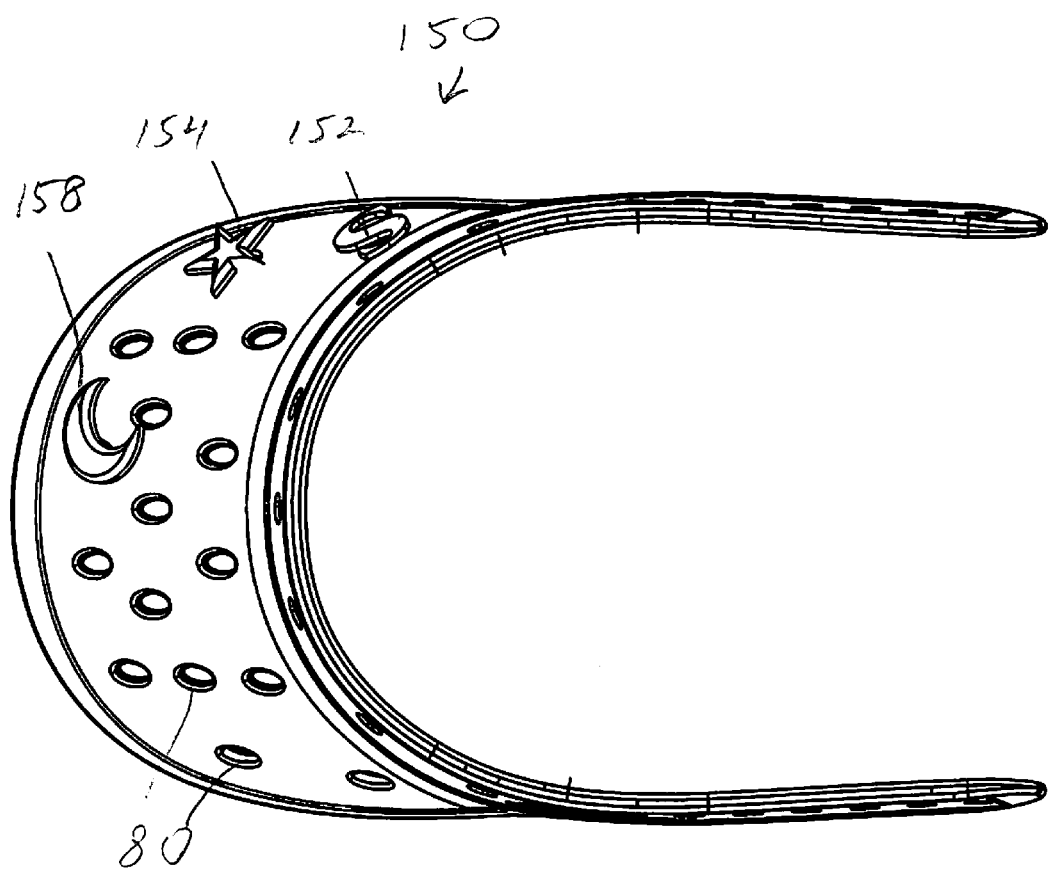
FIG. 25 is a top view of another visor assembly.
Figure 26:
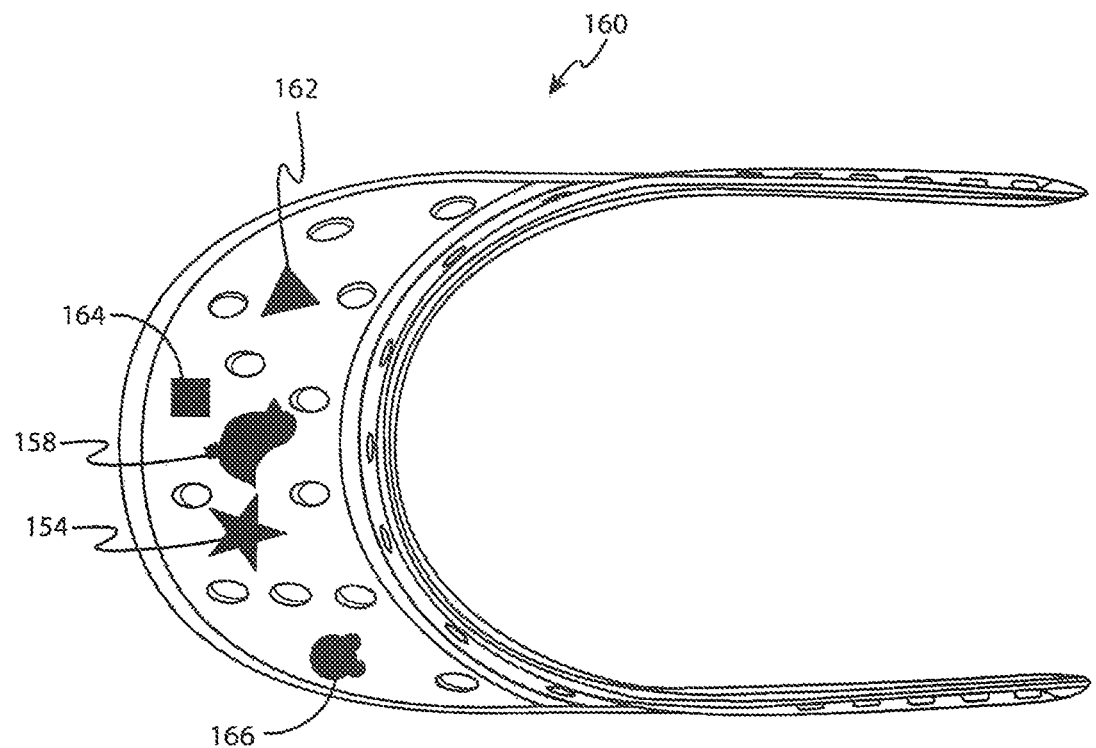
FIG. 26 is a top view of still another visor assembly.

FIG. 25 is a top view of another visor assembly 150. FIG. 26 is a top view of still another visor assembly 160. Here, different shapes, such as letter shaped cutout 152, star shaped cutout 154, half moon shaped cutout 158, triangle shaped cutout 162, rectangular/square shaped cutout 164, and other shapes 166, such as cartoon character shaped cutout 166 can be formed into the visor assembly 150, 160.

Figure 27:
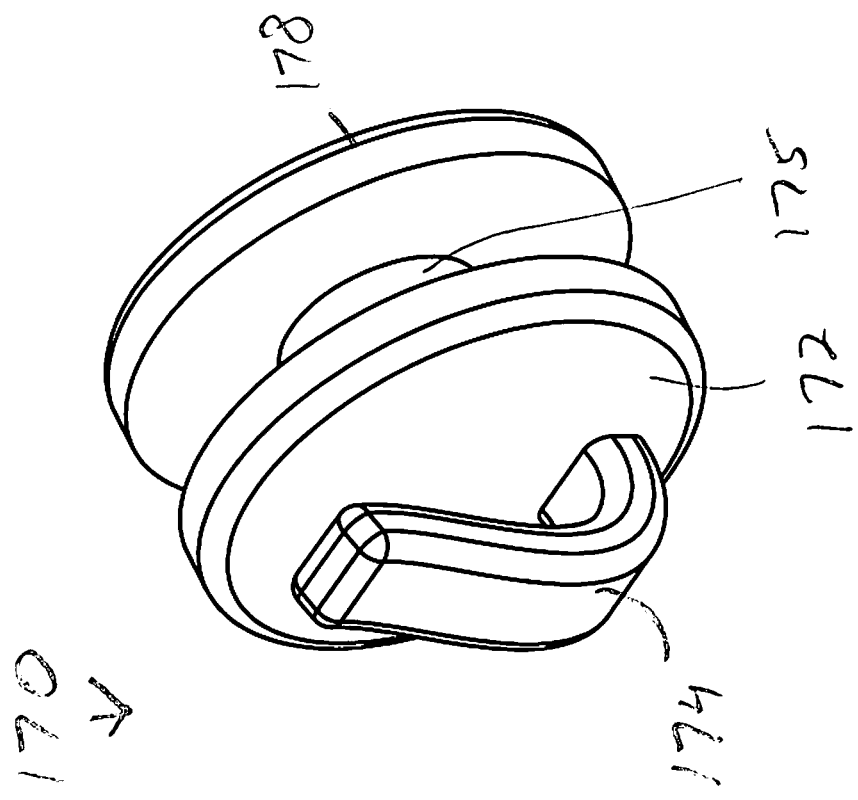
FIG. 27 is a perspective view of an adapter for mounting sunglasses/eyeglasses to the visor assembly.
Figure 29:
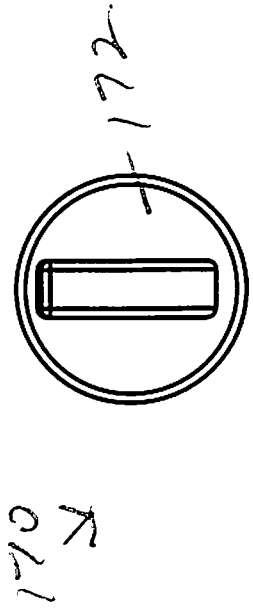
FIG. 29 is a front view of the adapter of FIG. 27.
Figure 28:
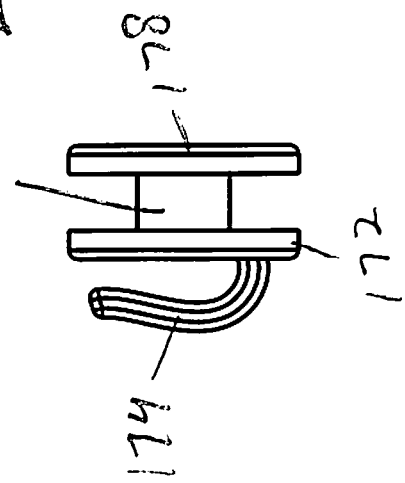
FIG. 28 is a side view of the adapter of FIG. 27.

FIG. 27 is a perspective view of an adapter 170 for mounting sunglasses/eyeglasses to the visor assembly 190 (shown in FIGS. 30-32. FIG. 28 is a side view of the adapter 170 of FIG. 27. FIG. 29 is a front view of the adapter 170 of FIG. 27. The adapter 170 can include a front wall 172 having a curved hook 174 fixed thereon, with a stem 175 to attach to a stud/rear wall 178.

FIG. 30 is a front perspective view of a visor assembly 190 with adapter of FIG. 27 and mounted sunglasses/eyeglasses 180. FIG. 31 is a side view of the visor assembly 190, adapter 170 and mounted sunglasses 180 of FIG. 30. FIG. 32 is a front view of the visor assembly 190, adapter 170 and mounted sunglasses 180 of FIG. 30. The user can push the stud/rear wall 178 of the adapter 170 through headband adjustment holes 100 on both sides of the visor assembly 190 with the free end of the hook 174 angled upward. Next, the arms 182 of the eyeglasses/sunglasses 180 can be positioned into the hook portions 174, with the glass portions of the eyeglasses/sunglasses 180 positioned on the visor/brim 20. The curved hooks 174 can be angled so that the arms 182 of the eyeglasses/sunglasses 180 are tightly held in place. The user can safely store their eyeglasses/sunglasses 180 on the visor assembly 190. And when the eyeglasses/sunglasses 180 are needed, the user, can easily remove the eyeglasses/sunglasses 180 from the adapter 170 to wear them when needed.

While the invention shows plug on labels and charms, the invention can be used with other accessories. For example, a scalp cover can attach to the top of the visor assembly and have plug in base members that allow for the cover to protect the scalp of the wearer. Furthermore, a neck shade attachment formed from similar material or formed from cloth or fabric, can attach by plugable members to the rear of the band strap. Still furthermore, other accessories, such as but not limited to sunglass shades, and the like, can also be plugable onto the visor assembly.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A visor assembly, comprising:
a brim and a front headband formed from a soft, flexible and pliable EVA (ethylene vinyl acetate) material, the EVA material modified to be waterproof, floatable, antibacterial, temperature tough resistant, stress crack resistant, and UV (ultra violet) radiation resistant; and
a plurality of slots on the visor assembly adapted for allowing accessories to be attachable to the visor assembly.

2. The visor assembly of claim 1, further comprising:
a separate removable rear headband strap having a first end for being attachable and detachable from the front headband, and a second end for being attachable and detachable from the front headband, the separate rear head band being molded from the soft, flexible and pliable EVA (ethylene vinyl acetate) material, the EVA material modified to be waterproof, floatable, antibacterial, temperature tough resistant, stress crack resistant, and UV (ultra violet) radiation resistant,
at least one accessory having a male member that mateably attaches into at least one of the slots, wherein the accessory is both attachable and detachable from the brim and the front headband.

3. The visor assembly of claim 2, wherein the removable rear head band strap includes:
rivet members having inwardly protruding portions for being insertable into a plurality of adjustment holes in the removable rear headband strap.

4. The visor assembly of claim 1, wherein the plurality of slots include:
at least one slot in the brim; and
at least one slot in the front headband.

5. The visor assembly of claim 1, further comprising: least one accessory that includes:
a logo plate, having indicia across a front surface of the logo plate.

6. The visor assembly of claim 1, further comprising at least one accessory that includes
a decorative charm.

7. The visor assembly of claim 1, further comprising at least one accessory that includes
both a logo plate and a decorative charm.

8. The visor assembly of claim 1, wherein the plurality of slots include circular shapes.

9. The visor assembly of claim 1, wherein the plurality of slots include geometrical shapes.

10. The visor assembly of claim 1, wherein the plurality of slots include outline shapes of different characters and objects.

11. The visor assembly of claim 1, wherein the plurality of slots include:
both through-holes and partial cutouts in the visor assembly.

12. The visor assembly of claim 11, wherein the brim includes:
both through-holes and partial cut-outs.

13. The visor assembly of claim 1, further comprising:
a puncture tool for puncturing a through-hole in the visor assembly.

14. The visor assembly of claim 1, further comprising:
an adapter for attaching a sunglass or eyeglass to the visor assembly.

15. A visor assembly, comprising:
a one-piece brim and front headband formed from a soft, flexible and pliable foam material modified to be waterproof, floatable, antibacterial, temperature tough resistant, stress crack resistant, and UV (ultra violet) radiation resistant;
a plurality of slots along a front surface portion of the brim and the front headband;
a removable rear headband strap attachable to left and right portions of the front headband; and
at least one accessory having a male member that mateably attaches into at least one of the slots, the at least one accessory being selected from a logo plate and a decorative charm.

16. The visor assembly of claim 15, wherein the soft flexible and pliable foam material includes EVA (ethylene vinyl acetate) material.

17. The visor assembly of claim 15, wherein the removable rear headband strap is formed from a soft, flexible and pliable EVA (ethylene vinyl acetate) material, the EVA material modified to be waterproof, floatable, antibacterial, temperature tough resistant, stress crack resistant, and UV (ultra violet) radiation resistant.

18. A headgear with visor, comprising:
a brim and headband formed from a soft, flexible and pliable plastic foam material that is modified to be waterproof, floatable, antibacterial, temperature tough resistant, stress crack resistant, and UV (ultra violet) radiation resistant; and
a plurality of slots in the headgear adaptable for allowing accessories to be attachable and detachable from the headgear.

19. The headgear with visor of claim 18, wherein the soft, flexible and pliable plastic foam includes: EVA (ethylene vinyl acetate) material.

20. The headgear with visor of claim 19, further comprising:
a rear headband strap formed from the soft, flexible and pliable plastic foam material that is modified to be waterproof, floatable, antibacterial, temperature tough resistant, stress crack resistant, and UV (ultra violet) radiation resistant.

* * * * *